Figure 9:
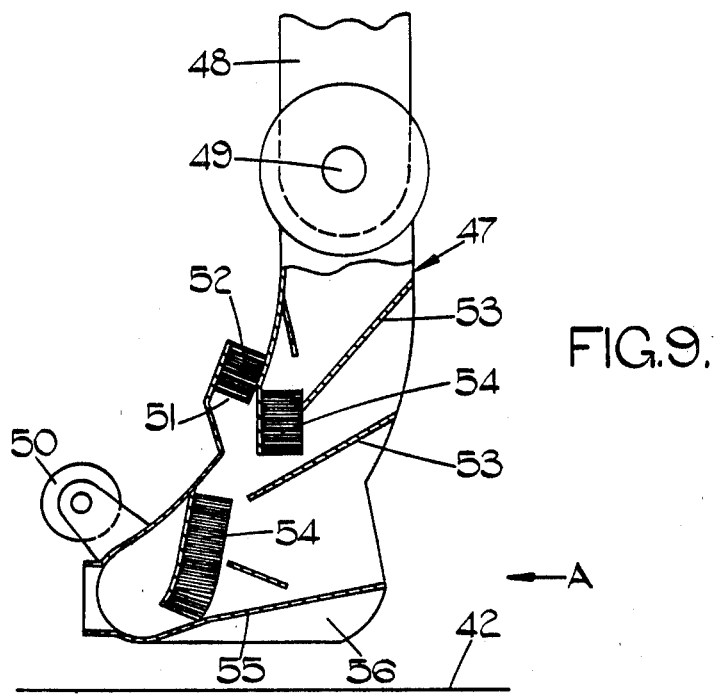

United States Patent [19]

Goodall

[11] 4,372,570
[45] Feb. 8, 1983

[54] SPRAY-INHIBITING MEANS FOR USE ON A ROAD VEHICLE

[75] Inventor: Maurice Goodall, Burton-on-Trent, England

[73] Assignee: Maurice Goodall (Holdings) Limited, Staffordshire, England

[21] Appl. No.: 151,207

[22] Filed: May 19, 1980

[30] Foreign Application Priority Data

May 23, 1979 [GB] United Kingdom ............... 7917900
Aug. 11, 1979 [GB] United Kingdom ............... 7928041

[51] Int. Cl.³ ............................................. B62B 9/16
[52] U.S. Cl. ........................... 280/154.5 R; 280/153 R
[58] Field of Search ............... 280/154.5 R, 154.5 A, 280/156, 157, 154, 153 R, 152 R; 296/15

[56] References Cited

U.S. PATENT DOCUMENTS

| | | | |
|---|---|---|---|
| 1,828,451 | 10/1931 | Shreffler | 280/152 R |
| 3,834,732 | 9/1974 | Schons | 280/154.5 R |

FOREIGN PATENT DOCUMENTS

| | | | |
|---|---|---|---|
| 644810 | 5/1937 | Fed. Rep. of Germany | 280/152 R |
| 2524344 | 12/1976 | Fed. Rep. of Germany | 280/154.5 R |
| 1053073 | 1/1954 | France | 280/152 R |
| 2043006 | 10/1980 | United Kingdom | 280/154.5 R |

OTHER PUBLICATIONS

PCT/SE78/00016, A Splash Protection Assembly for Vehicles Equipped with Mud Guards, Andrezej, U.S. Patent Office.

*Primary Examiner*—Robert J. Spar
*Assistant Examiner*—Donald W. Underwood
*Attorney, Agent, or Firm*—Andrus, Sceales, Starke & Sawall

[57] ABSTRACT

This invention relates to spray-inhibiting means for use on a road vehicle, said means comprising a screen which is arranged to intercept water thrown rearwardly from a vehicle wheel behind which in use the screen would be mounted. The screen (13 or 14) incorporates a hollow portion (15 or 31 or 38 or 44 or 47) together with means (18a or 33 or 34 or 41 or 43 or 54) for intercepting and collecting water which in use will be thrown against and into the hollow portion, together with baffle means (18 or 32 or 40 or 53) which are disposed within the hollow portion, the latter being also provided with an inlet 23 and an outlet 20. The baffle means and the inlet and outlet are so constructed that when in use the associated vehicle is traveling along a road surface in wet conditions spray will be thrown rearwardly from a vehicle wheel so as to enter the interior of said hollow portion which will act to extract water from the spray and discharge it horizontally rearwardly from the outlet so that the water moves forwardly, relative to the road surface, at a velocity less than that of the moving vehicle to thereby reduce spray formed by the discharged water as it engages the road surface.

4 Claims, 10 Drawing Figures

U.S. Patent  Feb. 8, 1983  Sheet 1 of 3  4,372,570
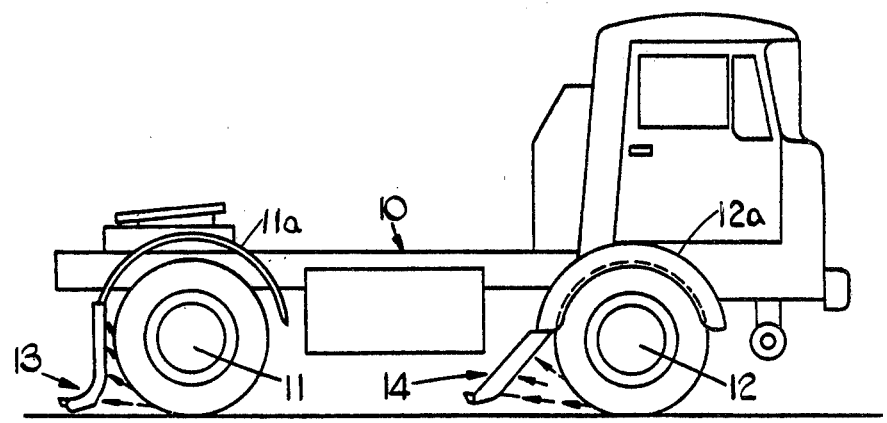
FIG.1.
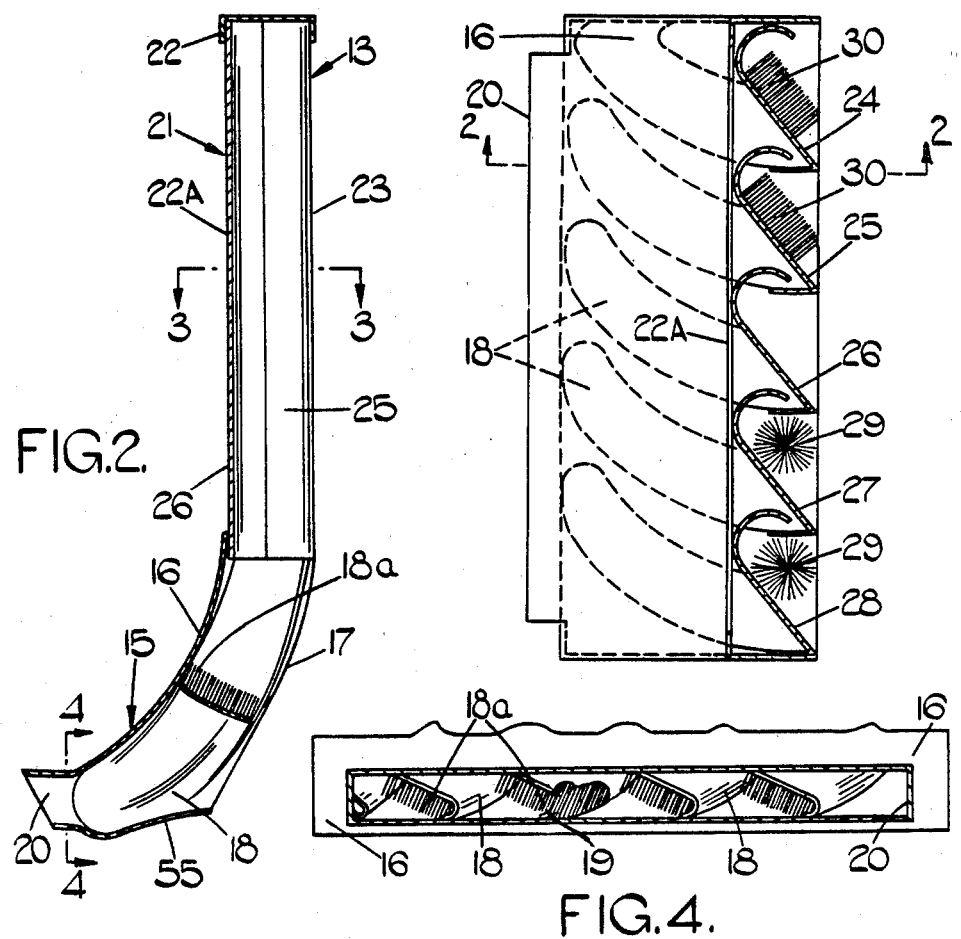
FIG.2.
FIG.3.
FIG.4.

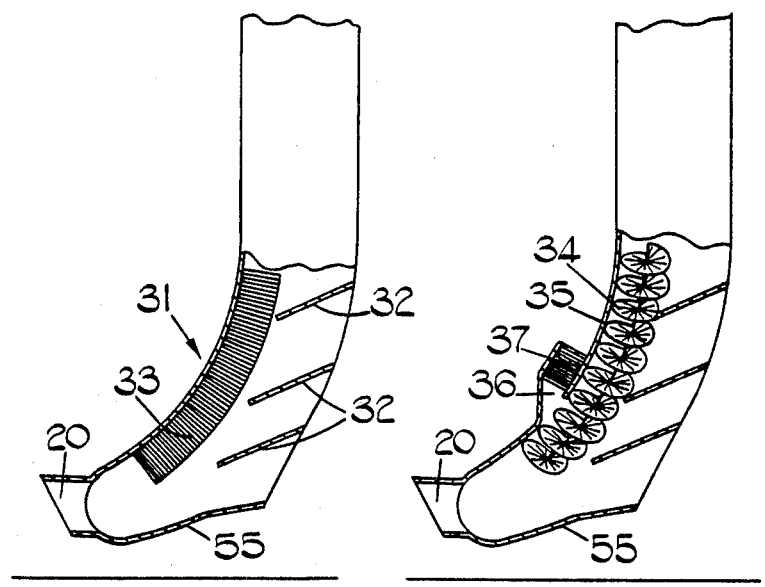
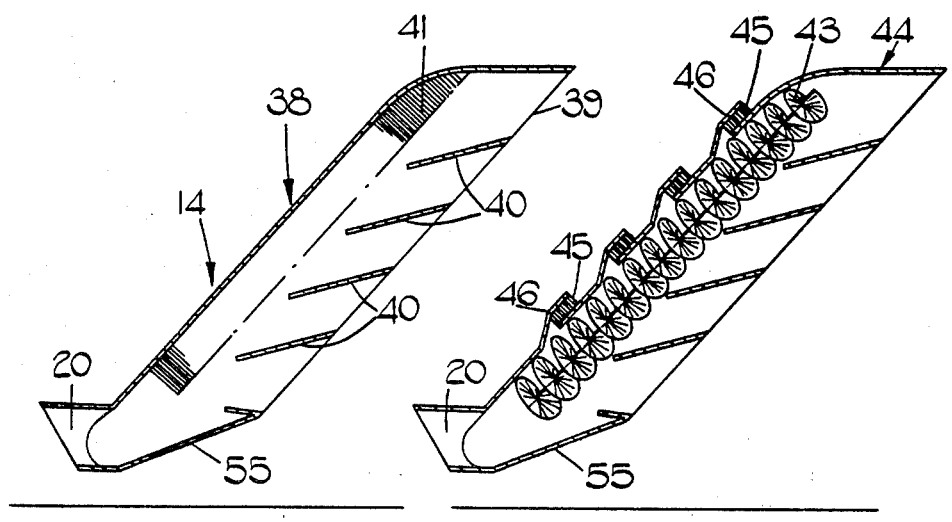

U.S. Patent Feb. 8, 1983 Sheet 3 of 3 4,372,570

SPRAY-INHIBITING MEANS FOR USE ON A ROAD VEHICLE

This invention relates to spray-inhibiting means for use on a road vehicle. The need for such spray-inhibiting means occurs of course when a vehicle is travelling in wet weather and especially if it is then travelling at high speed as may occur for example on a motorway. In such conditions the vehicle will tend to create a considerable amount of spray which will represent a hazard to other vehicles and it is an object of the present invention to provide an improved form of spray-inhibiting means which will in use substantially reduce the amount of spray that is generated.

In accordance with the invention there is provided spray-inhibiting means for use on a road vehicle which comprises a screen adapted to intercept water thrown rearwardly from a vehicle wheel behind which in use said screen would be mounted, said screen incorporating a hollow portion which has water-intercepting means for intercepting and collecting water which in use is thrown through an inlet against and into said hollow portion, baffle means disposed within said hollow portion, and an outlet, the baffle means and inlet and outlet being so constructed that in use water will be discharged horizontally rearwardly from the outlet so that the water moves forwardly, relative to the road surface, at a velocity less than that of the moving vehicle to thereby reduce spray formed by the discharged water as it engages the road surface.

The screen may also incorporate an upper hollow portion which is disposed above a lower hollow portion so as to communicate with the interior thereof and which also has water-intercepting means arranged to intercept and collect water which in use is thrown against said upper portion so as to direct such water downwardly into the interior of lower hollow portion. The water-intercepting means of the upper portion may comprise a plurality of spaced parallel baffles which provide between them a plurality of passages of generally sinuous configuration in cross-section and said baffles may be provided on their forwardly-directed faces with brush-like water-collecting elements.

Conveniently the cross-sectional area of the inlet of the hollow portion is greater than the cross-sectional area of the outlet. And in addition the baffle means of said hollow portion may converge towards the outlet. The rear part of the interior of the hollow portion may also be provided with brush-like water-collecting means and the rearwardly-directed face of the hollow portion may be provided with at least one pressure-relieving aperture.

The invention will now be more particularly described with reference to the accompanying drawings wherein FIG. 1 is a side view showing a road vehicle having front and rear wheels which are each fitted with examples of spray-inhibiting means in accordance with the invention, FIG. 2 is an enlarged sectional elevation taken on the line 2—2 of FIG. 3, of the rear spray-inhibiting means seen in FIG. 1, FIG. 3 is a sectional plan view taken on the line 3—3 of FIG. 2, FIG. 4 is a partial sectional end view taken on the line 4—4 of FIG. 2 with one of the baffles broken away, FIGS. 5 and 6 are partial sectional elevations showing respectively two further examples of spray-inhibiting means in accordance with the invention.

Figure 10:
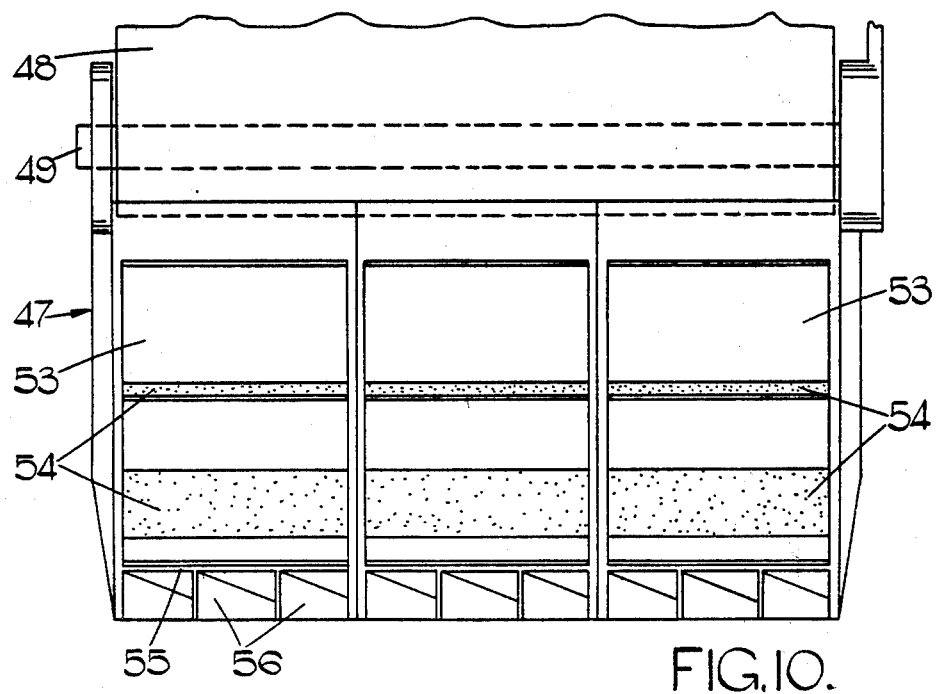

FIGS. 7 and 8 are sectional elevations showing respectively two more examples of spray-inhibiting means in accordance with the invention, and FIGS. 9 and 10 are respectively a partial sectional elevation and a partial end view (taken in the direction of arrow 'A' in FIG. 9) of yet a further alternative example of spray-inhibiting means in accordance with the invention.

Referring firstly to FIG. 1 of the drawings there is shown therein a road vehicle 10 which is provided with examples of spray-inhibiting means in accordance with the invention. Thus the vehicle 10 as shown in the present embodiment has a pair of rear wheels 11 and a pair of front wheels 12 with both having mudguards or fenders 11a and 12a respectively. Mounted below the rear terminus of each fender and behind the respective wheels in the embodiment shown is a spray-inhibiting attachment comprising screens 13 and 14 respectively.

Referring now to FIGS. 2, 3 and 4 there is shown therein in greater detail one of said rear screens 13. Said screen incorporates a downwardly extending chamber forming housing or casing 15 which includes a rearwardly disposed wall portion 16, and a forwardly disposed portion generally parallel to portion 16, with said portions joined by side members (see FIGS. 3 and 4) to form a chamber for downward passage of water. The forwardly disposed portion has an inlet opening 17 for receiving water and the like thrown from wheel 11. The said forwardly disposed portion merges at its lower end into a bottom wall member 55 which is adapted to be positioned closely adjacent the road surface. The lower end portions of wall portion 16 and the said side members form, together with bottom wall member 55, a rearwardly facing discharge outlet or orifice 20. A plurality of curved baffles 18 which are each provided along their lower edges with inturned lips 19 are mounted within casing 15. Said curved baffles 18 are arranged so that a baffle at one side of the casing will form, together with the opposite side of the casing, a rearwardly converging path for spray entering the casing through inlet 17. Alternatively, a pair of baffles may be provided which converge rearwardly towards outlet 20. Water intercepting and collecting means in the form of brush-like means 18a having projecting fibres or bristles is mounted on the baffles 18. From an inspection of FIGS. 2, 3 and 4 it will be appreciated that the cross-sectional area of inlet 17 is greater than the cross-sectional area of outlet 20 so that the pressure of air contained in spray which in use is directed through inlet 17 will be increased to provide a force which will have the effect of ejecting water horizontally rearwardly through the outlet 20 so that the water moves forwardly, relative to the road surface, at a velocity less than that of the moving vehicle to thereby reduce spray formed by the discharged water as it engages the road surface.

Said screen 13 also includes an upper portion 21 comprising a casing 22 having an open forwardly-directed inlet face 23, the rear face 22a of such casing 22 being open. Said portion 21 is disposed above housing 15 so that the lower part of portion 21 communicates with the interior of housing 15. Furthermore said upper portion 21 contains a plurality of spaced parallel baffles 24, 25, 26, 27 and 28, each baffle being of generally 2-shaped configuration in cross-section and being spaced so as to provide between them a plurality of connected passages forming a generally wave-like sinuous form in cross-section. Said baffles may be provided on their forwardly-directed faces with brush-like water-collecting elements such as are shown in FIG. 3 in conjunction with baffles 24, 25, 27 and 28 or alternatively the baffles may be without such brush-like elements as is illustrated by baffle 26 in FIG. 3. Where such brush-like elements are provided they may be of generally spiral form as indicated by reference numeral 29 in association with baffles 27 and 28 or they may be of block-like or cuboidal form as is indicated by reference numeral 30 in association with baffles 24 and 25.

Whether or not said baffles are provided with the brush-like water-collecting elements, spray thrown against said upper portion 21 will impinge on the baffles and the water collected from the spray will run down the baffles into the interior of housing 15 from where it will pass rearwardly through the outlet 20. Most of the air will flow through the sinuous passages between the baffles in said upper portion 21 and through the rear face 22a. Some air will flow into the interior of the hollow portion 15 so as to increase the air pressure therein.

FIG. 5 is a partial sectional elevation showing a screen somewhat similar to the screen shown in FIGS. 2, 3 and 4 but in this case the hollow housing 31 has a plurality of horizontally extending spaced baffles 32 which are each arranged to direct spray entering the open forwardly disposed inlet of said hollow portion 31 downwardly and rearwardly towards the outlet 20. Furthermore the rear part of the interior of said hollow portion 31 is provided with brush-like water-collecting means 33 on which the spray will impinge and which will serve to separate the water from the air in the spray so as to cause the small droplets of water to coalesce into larger drops which will then be ejected rearwardly through the outlet 20. In the variations shown in FIG. 6 the brush-like water-collecting means 34 is of generally spiral form as opposed to the examples shown in FIG. 5 where said means 33 comprises a plurality of forwardly projecting bristles. In addition in the example shown in FIG. 6 there is provided on the rear face of the casing 35 a pressure relieving aperture 36 in which is mounted a further brush-like water collecting element 37, said aperture 36 being provided in order to control the degree of air pressure which may be built up within the interior of said hollow portion especially when the associated vehicle is travelling at relatively high speed. Thus air can escape through said aperture 36 but water droplets entrained in such air will be collected by the brush-like element 37 and will then run downwardly back into the interior of the hollow portion and thence rearwardly through the outlet 20.

As alternatives to the examples described in FIGS. 2, 3 and 4, and in FIG. 5 and in FIG. 6, FIGS. 7 and 8 show examples of screens which are especially adapted to be used in conjunction with the front wheels of a vehicle in the manner shown in FIG. 1 with reference to screen 14.

FIG. 7 shows a screen comprising a hollow housing portion 38 having an open forwardly disposed inlet 39, the interior of said screen being provided with a plurality of spaced parallel baffles 40 which are directed inwardly and downwardly. The screen is also provided with an outlet 20 and with a brush-like water-collecting element 41 disposed within said hollow portion at the rear thereof. Spray which in use would be thrown rearwardly from the adjacent front wheel of the vehicle will thus enter said hollow portion 38 through inlet 39 and will then impinge on said baffles 40 which will have the effect of directing said spray rearwardly and downwardly and into contact with the brush-like water-collecting element 41 so as to separate the water which will coalesce and run downwardly into and through the outlet 20. The air pressure within the hollow portion will be increased (because the cross-sectional area of inlet 39 is greater than the cross-sectional area of the outlet 20) to provide a force which will eject said water horizontally rearwardly from outlet 20 so that the water moves forwardly relative to the road surface, at a velocity less than that of the moving vehicle to thereby reduce spray formed by the discharged water as it engages the road surface. FIG. 8 depicts a construction somewhat similar to the construction shown in FIG. 7 except that the brush-like water-collecting element 43 is now of spiral form instead of being provided with a plurality of generally forwardly-directed bristles as is shown with element 41. Furthermore the rear face of the hollow housing portion 44 seen in FIG. 8 has a plurality of apertures 45 each provided with brush-like water-collecting elements 46 which will substantially prevent water from escaping through said apertures 45 whilst the apertures themselves will control the air pressure within the hollow portion 44 by preventing it from rising to an unnecessarily high value when the associated vehicle is travelling at high speed.

FIGS. 9 and 10 show a further example of spray-inhibiting means constructed in accordance with the present invention, the examples shown therein being especially intended for use in conjunction with the rear wheels of a vehicle. In this case the hollow housing portion 47 is pivotally connected to an upper portion 48 about an axis 49 and linkage (not shown) may be provided so that said hollow portion 47 will maintain a substantially constant position relative to the ground surface 42 irrespective of the loading of the vehicle and/or may be arranged to lift said hollow portion 47 if, on reversing the vehicle, the rearmost part of said hollow portion 47 should come into contact with a curb or other obstruction. Conveniently a roller 50 is provided for engaging such curb or other obstruction in order to prevent damage being caused to said hollow portion 47. The hollow portion 47 is also provided with an open forwardly disposed inlet whereas the rear of said hollow portion 47 has at least one aperture 51 in which is mounted a brush-like water-collecting element 52, each aperture 51 acting to relieve the internal pressure within said hollow portion 47 in the manner previously explained. The interior of said hollow portion 47 contains a plurality of generally horizontally extending baffles 53 which however are arranged to converge in a rearwards direction toward each other and toward orifice 20, and further brush-like water-collecting elements 54 are provided within the interior of the hollow portion 47, said elements 54 being disposed adjacent to the rear edges of the baffles 53. The lowermost element 54 is, as shown, curved rearwardly along its lower portion so that it meets the lower bottom part 55 of said hollow portion. Furthermore, the baffles 53 and elements 54 may be divided into a plurality of sections or units as may be seen in FIG. 10 which can be connected together in a casing forming said hollow portion 47 or said baffles 53 and elements 54 may be formed as a cartridge which is separate from the casing so that new cartridges can be inserted if an existing cartridge is damaged or dirty. The bottom 55 of said hollow portion 47 is also provided with blades 56 which can be inclined in a sideways direction to direct laterally spray which passes beneath the hollow portion.

The screens 13 and 14 may also be connected to a linkage or linkages or other mechanisms (not shown) which will have the effect of maintaining such screens at a substantially constant position relative to the road surface irrespective of the load on the vehicle and/or said screens may also be connected to mechanism which is operable by the driver of the vehicle whereby the screens can be lifted under the control of the driver when desired if for example the vehicle is travelling over heavy or undulating or rough ground or in muddy or snowy conditions.

In the above-described embodiments and where it is desired to use brush-like water-collecting elements of generally block-like or cuboidal form adjacent baffles may be provided with opposed water-collecting elements so that their bristles (or, for example, blade-like fibres) extend towards each other so that the free ends of the bristles or fibres of one element either overlap or are spaced a short distance from the free ends of the bristles or fibres of the other element. As an alternative however to using such brush-like water-collecting elements on the interior face of the rear of the hollow portion (such as is shown for example by reference numeral 33 or 41 in association respectively with hollow portion 31 or 38) said interior face may be formed with a plurality of short integral projections or otherwise roughened so that spray entering the hollow portion will impinge on the roughened surface which will then have the effect of condensing droplets of water contained in the spray into larger drops which will join together to form a stream or streams which will eventually pass through the outlet 20. Moreover, the lower generally horizontal bottom part of the hollow portion, indicated by reference numeral 55 in FIG. 9 and also in FIGS. 2, 5, 6, 7 and 8, may be inclined slightly upwardly toward the front inlet of the hollow housing portion so that it can thereby control and guide beneath the lower bottom portion the lowermost portion 55 of spray that in use will be thrown rearwardly by the associated wheel of the vehicle.

Furthermore, the baffles of the hollow housing portion may be arranged, where said hollow portion is intended for use with a wheel assembly comprising a pair of tyres mounted side by side, to separate the spray ejected by said tyres to form two streams which are then directed into separate outlets. Alternatively, if there are for example only two baffles, these may be arranged asymmetrically so that the stream of water passing rearwardly through the hollow portion will be directed to one side or the other of a vertical, centrally disposed plane, the outlet 20 then being appropriately offset and being less wide than the overall width of the hollow portion.

I claim:

1. A spray-inhibiting attachment for mounting behind the wheel of a vehicle, said attachment comprising:
    (a) a downwardly extending hollow housing having a forwardly disposed portion and with the latter forming an inlet opening for receiving therethrough water and the like thrown rearwardly from the vehicle wheel,
    (b) said housing also having a rearwardly disposed wall portion spaced from and generally parallel to said forwardly disposed portion and with said portions being joined by side members to form a chamber for downward passage of water therein,
    (c) said forwardly disposed portion merging at its lower end into a bottom wall member which is adapted to be positioned closely adjacent the road surface,
    (d) the lower portion of said rearwardly disposed wall portion and said side members forming, together with said bottom wall member, a generally horizontal rearwardly facing water discharge orifice of substantially lesser cross-sectional area than said inlet opening so that water discharging horizontally rearwardly through said orifice from said chamber moves horizontally forwardly, relative to the road surface, at a velocity less than that of the moving vehicle to thereby reduce spray formed by the discharged water as it engages the road surface,
    (e) said attachment also incorporating an upper portion which is disposed above said hollow housing so as to communicate with the interior thereof and which has water-intercepting means arranged to intercept and collect water which in use is thrown against said upper portion by the vehicle wheel so as to direct such water downwardly into the said chamber,
    (f) said water intercepting means of said upper portion comprising a plurality of spaced parallel baffles which provide between them a plurality of connected passages forming a generally wave-like sinuous configuration in cross-section.

2. The spray-inhibiting attachment as claimed in claim 1 wherein said baffles have forwardly-directed faces with brush-like water-collecting elements disposed thereon.

3. The spray-inhibiting attachment as claimed in claim 2 wherein said brush-like water-collecting elements are of spiral form.

4. A spray-inhibiting attachment for mounting behind the wheel of a vehicle, said attachment comprising:
    (a) a downwardly extending hollow housing having a forwardly disposed portion and with the latter forming an inlet opening for receiving therethrough water and the like thrown rearwardly from the vehicle wheel,
    (b) said housing also having a rearwardly disposed wall portion spaced from and generally parallel to said forwardly disposed portion and with said portions being joined by side members to form a chamber for downward passage of water therein,
    (c) said forwardly disposed portion merging at its lower end into a bottom wall member which is adapted to be positioned closely adjacent the road surface,
    (d) the lower portion of said rearwardly disposed wall portion and said side members forming, together with said bottom wall member, a generally horizontal rearwardly facing water discharge orifice of substantially lesser cross-sectional area than said inlet opening so that water discharging horizontally rearwardly through said orifice from said chamber moves horizontally forwardly, relative to the road surface, at a velocity less than that of the moving vehicle to thereby reduce spray formed by the discharged water as it engages the road surface,
    (e) said attachment also incorporating a generally vertical upper portion which is mounted atop said hollow housing so as to communicate with the interior thereof and which has water-intercepting means arranged to intercept and collect water which in use is thrown against said upper portion by the vehicle wheel so as to direct such water downwardly into the said chamber, (f) said water-intercepting means comprising a plurality of transversely spaced side-by-side baffles within said upper portion and with said baffles providing a plurality of interconnected generally vertical passages between them, (g) the baffles of said water intercepting means of said upper portion being parallel and the said passages being of generally wave-like sinuous configuration in cross-section.

* * * * *